Jan. 2, 1923.
H. C. MAPLE.
LAWN OR HEDGE TRIMMER.
FILED FEB. 19, 1921.
1,441,014.
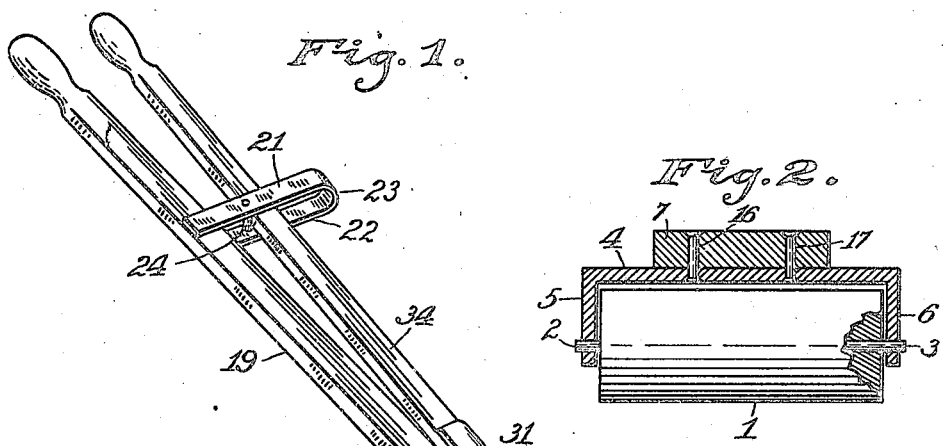
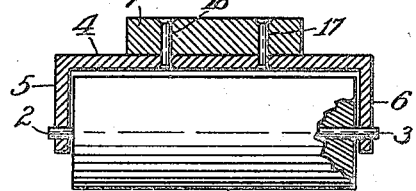
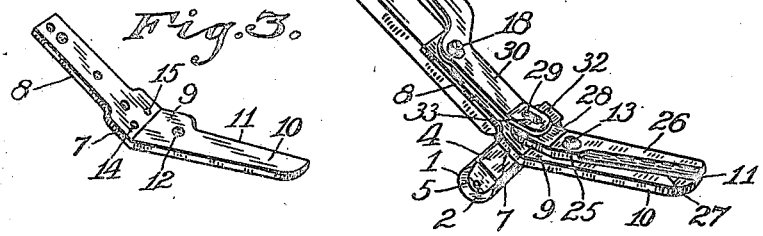
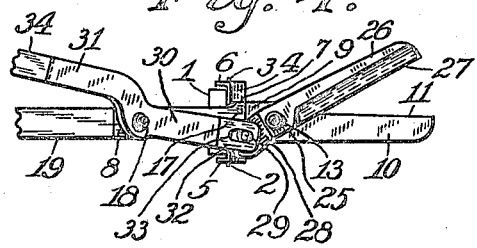
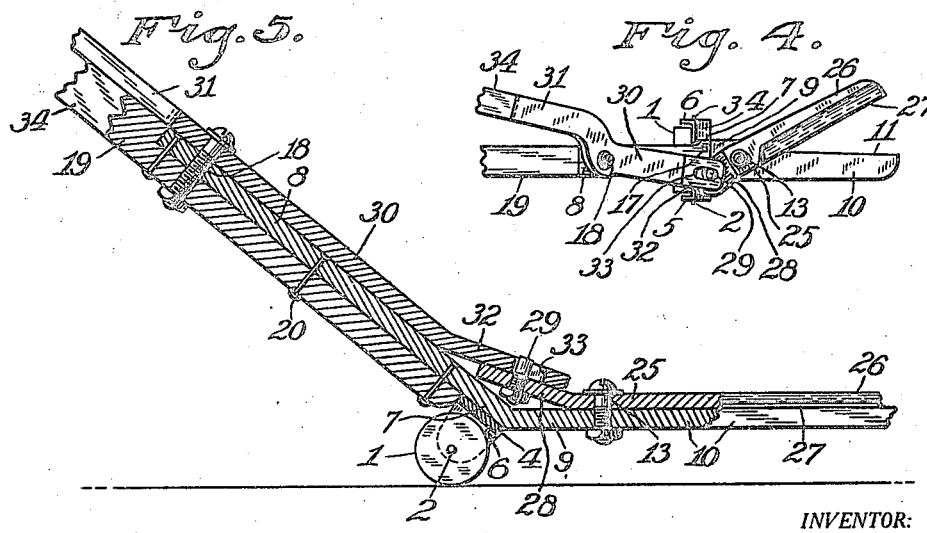
INVENTOR:
Harry C. Maple,
BY
E. D. Silvius,
ATTORNEY.

Patented Jan. 2, 1923.

1,441,014

UNITED STATES PATENT OFFICE.

HARRY C. MAPLE, OF INDIANAPOLIS, INDIANA, ASSIGNOR OF ONE-HALF TO EDWIN WILSON, OF INDIANAPOLIS, INDIANA.

LAWN OR HEDGE TRIMMER.

Application filed February 19, 1921. Serial No. 446,403.

*To all whom it may concern:*

Be it known that I, HARRY C. MAPLE, a citizen of the United States, residing at Indianapolis, in the county of Marion and State of Indiana, have invented a new and useful Lawn or Hedge Trimmer, of which the following is a specification, reference being had to the accompanying drawings and to the letters and figures of reference marked thereon.

This invention relates to a type of movably supported grass trimmer that has a pair of shear blades, and is manually guided and operated by extension or long handles.

An object of this invention is to provide a convenient, light weight, simple, substantial and economical grass trimmer for use on edges of lawns and about shrubbery. Another object is to provide an easy-working, reliable and positively manipulated grass trimmer. Still another object is to provide accuracy of direction and control, while operating the grass trimmer in restricted or close places.

With the above-mentioned and other objects in view, the invention consists in an improved grass trimmer having convenient operating means for easily securing a shearing action. The invention consists also further in the novel parts, combinations, and arrangements of parts, hereinafter more particularly described and set forth in the accompanying claims.

Referring to the drawings,—Figure 1 is a perspective view of the improved grass trimmer; Fig. 2 is a transverse sectional view of the running gear of the trimmer frame; Fig. 3 is a perspective view of the main shear blade and a part of the frame; Fig. 4 is a plan view, showing the shears opened, with the handles broken away; and, Fig. 5 is a longitudinal central sectional elevation with the handles and shear blades broken away.

Similar reference characters in the different figures of the drawings apply consistently throughout to the like parts or features of construction herein referred to.

The grass trimmer as practically constructed consists of a supporting running gear comprising a roller 1, having axle or shaft ends 2 and 3 secured to and projecting therefrom to form an axle, and a housing or frame comprising a main member 4 having legs 5 and 6 which comprise the bearings in which the roller shaft is rotatable.

A novel frame member and shear blade is provided, consisting of a frame portion 7, a relatively narrow shank 8, and a frame portion or extension 9 integral with the portion 7 and relatively at an obtuse angle to the frame portion 7, the frame portion 9 having a relatively narrow shear blade 10 integral therewith, the blade having a cutting edge 11. The extension 9 is provided with a threaded hole 12 in which a pivot bolt 13 is secured rigidly in position. The frame portion 7 is provided with rivet holes 14 and 15 for attaching the running gear to the frame portion 7 by rivets 16 and 17, and the shank 8 has a rigidly secured pivot bolt 18 thereon which aids in securing a wooden control handle bar 19 that is further secured to the frame by rivets 20.

Upon the control handle bar 19 a yoke guide is provided consisting of guide plates 21 and 22 secured to the handle bar and a curved stop or loop portion 23 integral with the plates, and a spacer stud 24 between and riveted to the guides 21 and 22 and having the dual purpose of limiting movement as well as providing rigidity and strength.

A novel operating shear member is provided consisting of a base portion 25, an integral blade 26 on one end with a cutting edge 27, and an operating shank 28 on the opposite end of the base portion extending relatively at an obtuse angle from the base portion and into which is threaded, for rigid support, a pivot stud 29.

A lever is fulcrumed between its ends on the pivot bolt 18 so as to have arms 30 and 31 and an extension 32, relatively at an obtuse angle on the arm 30 in which is a slotted hole 33 receiving the stud 29. An operating handle bar 34 is attached to the lever arm 31, which actuates and controls the operating shear blade 26 for producing a cutting action.

In practical use, an operator may comfortably stand or walk on the ground, without being required to stoop or sit in cramping position, and the roller 1 being on the ground the operator grasps the handle bars 19 and 34 to control and operate the apparatus, holding the handle bars at such angle as may be necessary to maintain the shear blade 10 either horizontally or slightly inclined up or down, depending on the nature of the vegetation as to whether or not it may be desired to trim more or less closely to the ground. The handle bar 34 is moved laterally in the yoke which properly limits its movements, the stop 24 preventing the operator from bringing his hands together with possible injury to them. As the lever arm 30 is moved intermittently in opposite directions it causes movement of the stud 29 and the operating shank 28, resulting in the oscillatory movement of the shear blade 26 upon the blade 10, so as to effect shearing operations. The machine is rapidly pushed forward or drawn backward alternately by means of the handle bars and may be pushed in different directions as may be required to reach the grass requiring trimming. The apparatus in some cases may be used also for trimming hedges, and in such cases an assistant may hold the supporting frame in his hands to guide the shears in operation.

Having thus described the invention, what is claimed as new is—

1. A lawn or hedge trimmer including a supporting frame and a main shear blade fixed thereto, the frame having a shank that is angular relatively to the shear blade, a roller mounted in the frame, a handle bar secured to the shank, a movable shear blade pivoted to the main shear blade and having a relatively angular operating member integral thereon, a lever pivoted between its ends to the shank to constitute two arms, one of the lever arms having operative connection with the operating member, and a handle bar secured to the remaining one of the lever arms.

2. A lawn or hedge trimmer comprising a supporting frame, a roller mounted in the frame, a frame member having two relatively angled portions integrally connected together, one of the angle portions being secured to the supporting frame and having a controlling shank integral thereon and the remaining angle portion having a shear blade thereon and also a pivot bolt, a handle bar secured to the shank, a guiding and movement-limiting yoke secured to the handle bar, a shear blade member comprising a base portion having a relatively angled operating shank on one end thereof and a shear blade on the opposite end thereof, the base portion being connected with said pivot bolt and the operating shank having a stud fixed thereon, an operating-lever pivotally connected between its ends to the controlling shank to constitute two lever arms, one of the arms having a relatively angled terminal portion that has a longitudinal slot receiving said stud to operate the shank on the base of the shear blade, and a handle bar secured to the remaining one of said lever arms and extending through said yoke for limited lateral movement therein.

In testimony whereof, I affix my signature in presence of two witnesses.

HARRY C. MAPLE.

Witnesses:
E. T. SILVIUS,
M. D. STEELE.